US007206599B2

(12) United States Patent
Lemley

(10) Patent No.: US 7,206,599 B2
(45) Date of Patent: Apr. 17, 2007

(54) INTEGRAL NAVIGATION KEYS FOR A MOBILE HANDSET

(75) Inventor: Brad Lemley, Lafayette, CO (US)

(73) Assignee: Kyocera Wireless Corp., San Diego, CA (US)

( * ) Notice: Subject to any disclaimer, the term of this patent is extended or adjusted under 35 U.S.C. 154(b) by 494 days.

(21) Appl. No.: 09/853,126

(22) Filed: May 9, 2001

(65) Prior Publication Data

US 2002/0168947 A1 Nov. 14, 2002

(51) Int. Cl.
*H04M 1/00* (2006.01)

(52) U.S. Cl. ............................ 455/550.1; 455/575.1; 455/90.3; 455/90.2; 455/566; 345/170; 341/21

(58) Field of Classification Search ............. 455/550.1, 455/90.1–90.3, 456.1, 457, 566, 565, 575, 455/575.1, 560.1; 379/428.01, 433.01, 433.06, 379/433.07, 368, 370; 341/22, 20; 345/161, 345/168, 160; 200/314, 5 R; D14/140, D14/142, 148, 150
See application file for complete search history.

(56) References Cited

U.S. PATENT DOCUMENTS

| | | | | |
|---|---|---|---|---|
| 5,594,778 A | * | 1/1997 | Schaupp et al. | 455/418 |
| 5,901,366 A | * | 5/1999 | Nakano et al. | 455/550.1 |
| 5,950,809 A | * | 9/1999 | Andre | 200/314 |
| 6,006,118 A | * | 12/1999 | Stephenson | 455/575.1 |
| 6,125,287 A | * | 9/2000 | Cushman et al. | 455/566 |
| 6,157,323 A | * | 12/2000 | Tso et al. | 341/22 |
| 6,310,609 B1 | * | 10/2001 | Morgenthaler | 345/170 |
| 6,402,616 B1 | * | 6/2002 | Ogata et al. | 463/37 |
| 6,437,709 B1 | * | 8/2002 | Hao | 341/23 |
| 6,463,278 B2 | * | 10/2002 | Kraft et al. | 455/418 |
| 6,466,202 B1 | * | 10/2002 | Suso et al. | 345/169 |
| 6,529,186 B1 | * | 3/2003 | Thayer | 345/161 |
| 6,677,541 B1 | * | 1/2004 | Rapeli | 200/5 A |
| 6,704,004 B1 | * | 3/2004 | Ostergård et al. | 345/170 |
| 6,766,179 B1 | * | 7/2004 | Shiau et al. | 455/566 |
| 6,771,992 B1 | * | 8/2004 | Tomura et al. | 455/575.1 |
| 6,810,271 B1 | * | 10/2004 | Wood et al. | 455/566 |
| 6,812,415 B1 | * | 11/2004 | Priesemuth | 200/5 R |
| 2001/0012790 A1 | * | 8/2001 | Park et al. | 455/565 |
| 2002/0142738 A1 | * | 10/2002 | Jambie et al. | 455/90 |

FOREIGN PATENT DOCUMENTS

| | | | |
|---|---|---|---|
| EP | 895418 A2 | * | 2/1999 |
| EP | 0895418 A2 | * | 3/1999 |
| FR | 2823045 A1 | * | 10/2002 |
| JP | 11355414 A | * | 12/1999 |
| JP | 2000032110 A | * | 1/2000 |
| WO | WO 200171746 A1 | * | 9/2001 |

* cited by examiner

*Primary Examiner*—Erika A. Gary
*Assistant Examiner*—Willie J. Daniel, Jr.

(57) ABSTRACT

Mobile telephone handset navigation functions are integrated into certain of the alphanumeric keys of the mobile keypad. Up, down, right, and left navigation functions are integrated into four alphanumeric keys. The mobile automatically toggles between the navigation and alphanumeric functions of these keys based on where the user is within the interface routine of the mobile. Optionally the user can manually toggle between the navigation and alphanumeric functions by pressing a menu key.

22 Claims, 3 Drawing Sheets

INTEGRAL NAVIGATION KEYS FOR A MOBILE HANDSET

BACKGROUND OF THE INVENTION

1. Field of the Invention (Technical Field)

The present invention relates to user interface with a telephone, in particular to the navigation keys of a mobile telephone handset.

2. Background Art

Mobile handsets typically comprise a rigid housing enclosing a printed circuit board, the associated electronic and electro-acoustic components, and an antenna, through which radio frequency (RF) signals are transmitted and received. The telephone user interfaces with the circuitry and microprocessor of the mobile through a keypad located on the front outer surface of the housing. This keypad is located on the same face of the housing as the microphone and speaker through which the user speaks and listens during communication. Keys on the keypad are pressed by the user to temporarily close an internal electronic switch and send a signal to the microprocessor of the mobile where an appropriate routine processes the input and operates the mobile. Graphical elements, such as alphanumeric characters and icons, are located on or near the keys to guide the user in interfacing with the mobile. For example, keys are identified with the numbers 0–9, letters of the alphabet, and the pound and asterisk symbols. Backlighting is provided on most mobiles to enhance the visibility of the keys and associated user interface graphical elements. A display above the keypad on the housing provides spatially-navigated menu trees, graphical user interface (GUI) windows, messaging, and readouts of data input by the user.

As mobile designs advance, more features are offered to the user, such as the ability to program and store information. One such feature is the ability to program the memory to store telephone numbers that are frequently dialed. A series of menus shown on the display aid the user in inputting this and other types of data, and also aid the user in accessing data. These features require an increasing number of keys and more detailed information on the display for the user to efficiently interface with the mobile. There are a variety of function keys provided on mobile handsets that are used to access these features. Navigation keys are a type of function key frequently used to spatially navigate through mobile GUIs and menu trees. These keys provide the ability to move up, down, left, or right within a menu, or to move a cursor within text or a numeric display. Navigation keys are typically located on the side of the mobile handset housing away from the main keypad, or they may comprise individual keys on the main keypad. They are usually identified with arrows indicating the direction of movement that the key provides. The up and down navigation keys are often used to move within menu options. Once the user has navigated to the desired location within a menu, the option is selected with an enter key. Left and right navigation keys are used to move in the up, down, left, and right directions within menu options, to move the cursor on a display. The left navigation key is also often used to delete incorrect data entry.

As the number of keys on the keypad of a mobile increases, the density of the keys within a given surface area increases and the size of each key decreases. Key spacing is further compromised as mobiles are made more compact to reduce weight and improve portability. This causes user interaction with the keys to be more cumbersome. Four navigation keys add to the already crowded keypad area and compete for space on the housing. The present invention increases the number of functions that a given key on a mobile keypad performs thereby decreasing the number of keys required, decreasing the key density on the keypad, and allowing for increased key size.

SUMMARY OF THE INVENTION (DISCLOSURE OF THE INVENTION)

A primary object of the present invention is to provide a navigation function integral with the alphanumeric keys of a keypad on a mobile telephone handset. Another object of the invention is to provide a navigation function that toggles automatically and manually between alphanumeric and navigation modes. Yet another object is to improve user interaction with the keypad of a mobile through a reduction in the number of keys, a reduction in key density, and increased key size.

The present invention integrates the navigation function into alphanumeric keys of the keypad on a mobile handset.

A primary advantage of the present invention is a reduction in the number of keys required on a mobile keypad that are used for interfacing with the mobile microprocessor. Another advantage of the invention is reduced density of keys on the keypad and correspondingly increased size of keys. Yet another advantage of the present invention is improved user interaction with the keys as the keys are spaced further apart and can be larger in size. Still another advantage is that automatic, and manual, toggling between navigation and alphanumeric modes of the keys further simplifies user interface with the mobile.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated into and forms a part of the specification, illustrates an embodiment of the present invention and, together with the description, serves to explain the principles of the invention. The drawing is only for the purpose of illustrating a preferred embodiment of the invention and is not to be construed as limiting the invention. In the drawings.

DESCRIPTION OF THE PREFERRED EMBODIMENTS (BEST MODES FOR CARRYING OUT THE INVENTION)

The present invention integrates the navigation function into certain of the alphanumeric keys of a keypad on a mobile telephone handset. In the preferred embodiment of the invention, four navigation functions are integrated into four alphanumeric keys already existing on the mobile. The mobile automatically toggles between the navigation and alphanumeric functions of the keys based on where the user is within the interfacing routine of the mobile. Optionally the user can manually toggle between the navigation and alphanumeric functions by pressing a menu key.

Figure 1:
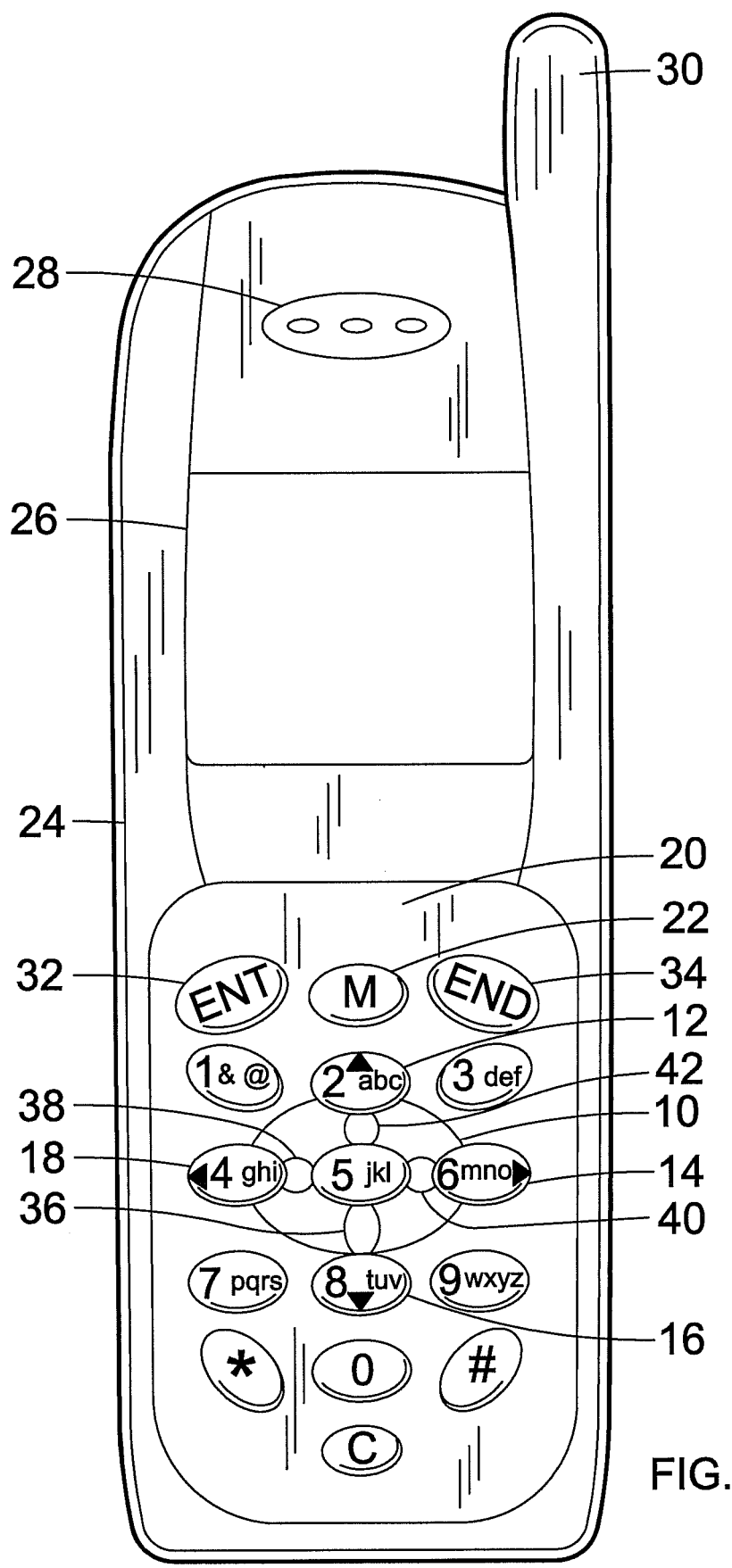
FIG. 1 is a front view of the present invention for a navigation function that is integral with the alphanumeric keys of a mobile handset.

Referring to FIG. 1, a front view of the invention for an integral navigation key on a mobile telephone handset is shown. Generally, a mobile handset consists of a rigid housing 24 that encloses communication electronics including a printed circuit board, the associated electronic and electro-acoustic components, a keypad having touch keys shown generally at 20, and an antenna 30. The user listens to received audio signals from speaker 28 and speaks through a microphone located at the opposite end of the mobile from speaker 28. A display 26 provides menus, messaging, and readout of user-input data. When pressed by the user, each key of keypad 20 makes contact with a corresponding electronic contact switch of a switch array on the printed circuit board. Upon making contact, the switch is temporarily closed and a signal is sent to the mobile microprocessor where a suitable routine implements the instruction received from the user. The keys of keypad 20 are configured to fit immediately behind the front face of housing 24 so that the keys protrude through corresponding openings in the front face of housing 24.

Graphical elements are located on the outer surface of each key and identify the function of the key to direct the user in interfacing with the mobile. For example, to dial a telephone number, the user presses the keys with the appropriate numbers, and then presses ENTER key 32 to dial the number. On many mobiles, a key identified as SEND provides this function. The mobile of FIG. 1 offers other features that are menu-driven that are operated by a software routine or routines within the mobile microprocessor.

Figure 2:
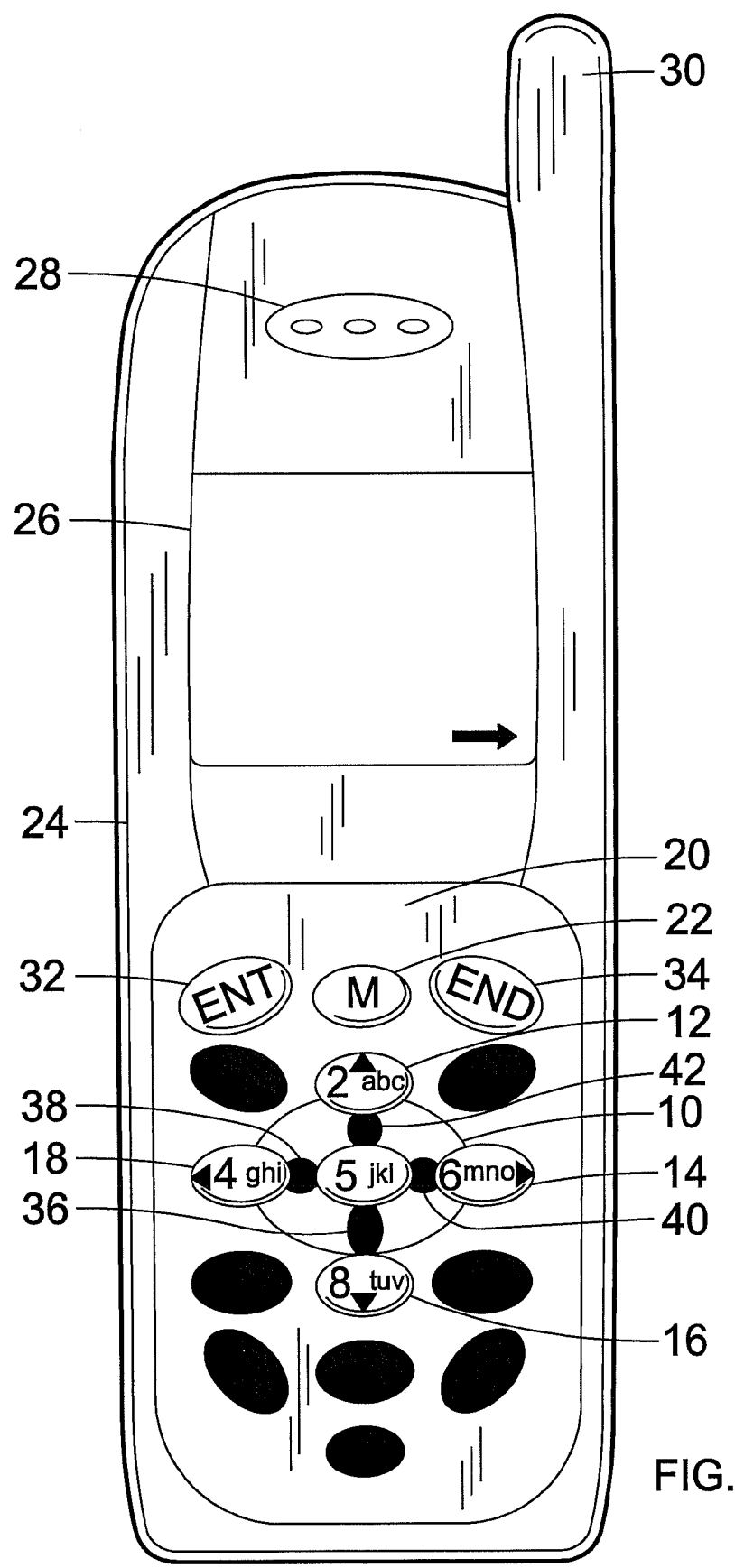
FIG. 2 is a front view of the mobile handset of FIG. 1 in navigation mode.
Figure 3:
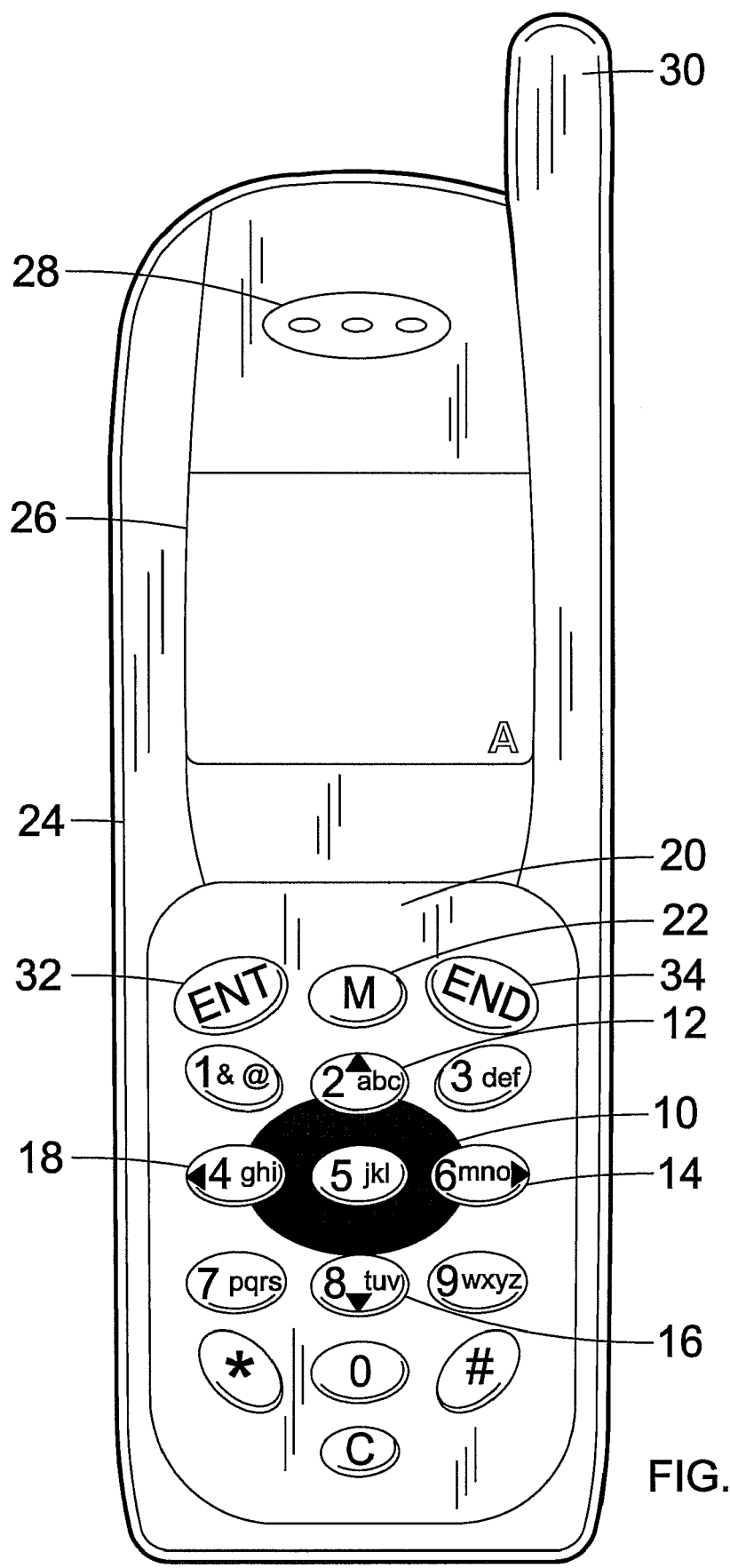
FIG. 3 is a front view of the mobile handset of FIG. 1 in alphanumeric mode.

Upon powering up the mobile, the interface routine of the mobile defaults to the alphanumeric mode enabling the user to dial telephone numbers. Alphanumeric mode is also used when inputting data, such as when inputting names associated with frequently dialed telephone numbers into memory. An icon, such as the letter "A", appears in the lower right hand corner of display 26 to indicate that the mobile is in alphanumeric model as illustrated in FIG. 3. To gain access to menu-driven options, the "M" or toggle, key 22 is pressed which places the mobile in the menu, or navigation, control mode. When in the navigation mode, an icon such as an arrow replaces the alphanumeric icon indicator in the lower right hand corner of display 26, to indicate navigation mode to the user, as illustrated in FIG. 2. In addition to or as an alternative indication of navigation mode, the housing surface area associated with navigation keys 10 shown in FIG. 1 as an oval, as well as navigation keys 10 are illuminated with a backlighting source whenever the mobile is in navigation mode FIG. 2. In contrast, all the keys of the keypad 20 are illuminated when in alphanumeric mode FIG. 3. Thus, in the navigation mode, navigation keys are illuminated without illuminating all of the keys on the keypad. Suitable backlighting sources include light emitting diodes (LEDs) and electroluminescent (EL) panels. As an alternative indicator of navigation mode to the user, housing surface areas shown at 36,38,40 and 42 which form a generally cross-shaped configuration and corresponding navigation keys 16,18,14, and 12 are individually illuminated as shown in FIG. 2 with a backlighting source when one of the keys is operated. A variety of illumination schemes and icon indicators can equally serve the purpose of indicating mode to the user.

Upon pressing "M" key 22 after power-up, a main menu is produced on the display, from which an option is to be selected. In order to navigate through menu options, the user operates the four navigation keys shown generally at 10 that are integrated or combined into four alphanumeric keys. The up navigation key 12 and down navigation key 16 are pressed to move up and down through menu options, while the right navigation key 14 and left navigation key 18 are used to move right and left if needed, depending on the menu structure on the display. ENTER key 32 is used to select from the menu options available on the display. ENTER key 32 and END key 34 are dual function keys. Because navigation keys 10 are in the navigation mode, ENTER key 32 automatically functions to select a menu option, or to enter data input, rather than to "send" a telephone number dialed. Further, while in navigation mode, END key 34 functions as a "back" key taking the user to the next higher menu screen in the menu hierarchy, rather than as an "end" key to end a telephone call.

If a menu option is selected that requires numerical or textual data input, navigation keys 10 automatically respond as numerical or textual keys within the alphanumeric mode until the data is entered. Once the data is entered as required by the menu option (most commonly by pressing ENTER key 32), navigation keys 10 automatically return to the navigation mode. While entering text or numerical data, navigation keys 10 can be toggled intermittently into the navigation mode to navigate through the data that has been input, and which is shown on display 26. This feature is useful if, for example, the user inputs incorrect data and must navigate through the data to edit the input. In this instance, after the data is incorrectly input, the "M" key 22 is pressed to enter navigation mode and the user navigates to the data to be edited. Then the user presses "M" key 22 to toggle into alphanumeric mode to edit the data. This procedure is repeated until editing is completed.

If a menu option such as "exit" is selected or any equivalent option in the microprocessor interface routine that exits the navigation mode, navigation keys 10 automatically return to alphanumeric mode. Then a telephone number can be dialed. The navigation keys 10 can be manually toggled back to navigation mode by pressing the "M" key 22. If this is done immediately after inputting a telephone number and before the number is dialed, the left navigation key 18 can be used to move the cursor left in the number input to delete characters that were incorrectly input. The automatic and manual toggling feature of navigation keys 10 is implemented in a suitable user interface routine in the mobile microprocessor utilizing algorithms well known to those with ordinary skill in the computer programming art. Navigation keys 10 can be manually toggled between the alphanumeric and navigation modes by pressing "M" key 22 at any suitable point in the user interface routine. However, if the navigation mode is unavailable at a particular point in the user interface routine, as previously determined in the design of the routine, the main menu is displayed. It is to be understood that while several functions of navigation keys 10 have been described, other navigation operations can be performed with the navigation keys of the present invention. Other operations could include various forms of data input by way of the navigation keys, and the invention is not limited to the operations described here. Other types of operations and data input by the user can also be sensed by the microprocessor routine to initiate automatic toggling between the two modes where necessary, and the invention is not limited to the operations described above.

The present invention increases the number of functions that the keys of a mobile handset perform, thereby decreasing the number of keys required. User interface is simplified by the reduction in number of keys, decreased key density in a given surface area on the mobile housing, and increased key size. Automatic toggling between navigation and alphanumeric modes further simplifies user interface with the mobile.

Although the invention has been described in detail with particular reference to this preferred embodiment, other embodiments can achieve the same results. Variations and modifications of the present invention will be obvious to those skilled in the art and it is intended to cover in the appended claims all such modifications and equivalents.

What is claimed is:

1. A mobile handset keypad of a mobile handset comprising an array of keys positioned on a surface of a mobile housing for user interface with the mobile handset, said array of keys, comprising:
   a plurality of alphanumeric keys that operate in an alphanumeric mode;
   a navigation scheme having at least one integral navigation and alphanumeric key configured to navigate through a plurality of menus in a navigation mode;
   an automatic toggling between said navigation mode and the alphanumeric mode comprising:
      a mode icon in a display indicative of the current mode the mobile handset is in;
      at least one illuminatable housing surface area, which is not a key, proximate to the at least one integral navigation and alphanumeric key; and
      at least one illumination source proximate to and underlying the at least one integral navigation and alphanumeric key and the at least one illuminatable housing surface area, the automatic toggling configured to illuminate the at least one illumination source for lighting the at least one integral navigation and alphanumeric key, without illuminating all of the keys, and the at least one illuminatable housing surface area when in the navigation mode to indicate that the handset is in the navigation mode to a user.

2. The mobile keypad of claim 1, further comprising a toggle key for toggling between the alphanumeric mode and the navigation mode manually.

3. The mobile keypad of claim 2, wherein said toggling between the alphanumeric mode and the navigation mode further comprises an automatic toggling between the alphanumeric mode and the navigation mode based upon user interaction with said plurality of menus and input data without manual toggling, said automatic toggling is further configured to illuminate the at least one illumination source for lighting the at least one integral navigation and alphanumeric key and the at least one illuminatable housing surface area and update said mode icon, indicating the alphanumeric mode or the navigation mode.

4. The mobile keypad of claim 1, wherein said at least one integral navigation and alphanumeric key comprises:
   a first integral navigation and alphanumeric key comprising an up navigation function;
   a second integral navigation and alphanumeric key comprising a down navigation function;
   a third integral navigation and alphanumeric key comprising a left navigation function;
   a fourth integral navigation and alphanumeric key comprising a right navigation function.

5. The mobile keypad of claim 4, wherein the at least one illumination source comprises:
   a first illumination source proximate to the first integral navigation and alphanumeric key;
   a second illumination source proximate to the second integral navigation and alphanumeric key;
   a third illumination source proximate to the third integral navigation and alphanumeric key;
   a fourth illumination source proximate to the fourth integral navigation and alphanumeric key.

6. The mobile keypad of claim 1, wherein at least one illuminatable housing surface area includes a single illuminatable housing surface area that is illuminated with the at least one integral navigation and alphanumeric key when the mobile handset is in the navigation mode.

7. The mobile keypad of claim 6, wherein the illuminatable housing surface area has an oval configuration that is illuminated with the at least one integral navigation and alphanumeric key when the mobile handset is in the navigation mode.

8. The mobile keypad of claim 1, wherein at least one illuminatable housing surface area includes multiple illuminatable housing surface areas that are illuminated with the at least one integral navigation and alphanumeric key when the mobile handset is in the navigation mode.

9. The mobile keypad of claim 8, wherein the multiple illuminatable housing surface areas are illuminated with the at least one integral navigation and alphanumeric key to form an illuminated cross-shaped configuration when the mobile handset is in the navigation mode.

10. A mobile handset, comprising:
   a microprocessor and menu display including software routines for creating and displaying a menu and a mode icon in a display, said software routines configured to automatically activate:
      said mode icon in said display indicative of the current mode the mobile handset is in; and
      an automatic toggling between a navigation mode and an alphanumeric mode;
   a housing including a front face with openings for touch keys and said display and containing said microprocessor;
   a plurality of switches within said housing;
   a keypad within said housing comprising an array of keys projecting through the openings in the front face of said housing, each interacting with one corresponding switch; the array of keys including:
      a plurality of alphanumeric keys that operate in said alphanumeric mode;
      a navigation scheme having said at least one integral navigation and alphanumeric key configured to navigate through a plurality of menus in said navigation mode;
   at least one illuminatable housing surface area, which is not a key, proximate to the at least one integral navigation and alphanumeric key;
   at least one illumination source proximate to and underlying the at least one integral navigation and alphanumeric key and the at least one illuminatable housing surface area the automatic toggling configured to illuminate the at least one illumination source for lighting the at least one integral navigation and alphanumeric key, without illuminating all of the keys, and the at least one illuminatable housing surface area when in the navigation mode to indicate that the handset is in the navigation mode to a user.

11. The mobile handset of claim 10, further comprising a toggle key for toggling between the alphanumeric and the navigation mode manually.

12. The mobile handset of claim 10, wherein said toggling between the alphanumeric mode and the navigation mode further comprises an automatic toggling between the alphanumeric mode and the navigation mode based upon user interaction with said plurality of menus and input data without manual toggling, said automatic toggling is further configured to illuminate the at least one illumination source for lighting the at least one integral navigation and alphanumeric key and the at least one illuminatable housing surface area and update said mode icon, indicating the alphanumeric mode or the navigation mode.

13. The mobile handset of claim 12, additionally comprising means for sensing user interaction with said plurality of menus and input data enabling the automatic toggling of said combined navigation and alphanumeric keys into the navigation mode.

14. The mobile handset of claim 13, additionally comprising means for sensing user interaction with said plurality of menus and input data enabling the automatic toggling of said combined navigation and alphanumeric keys into the alphanumeric mode.

15. The mobile handset of claim 14, additionally comprising means for manually toggling said combined alphanumeric and navigation keys into the alphanumeric mode when said menu displays options requiring alphanumeric mode input and into the navigation mode when said menu displays options requiring navigation mode input and for error correction purposes.

16. The mobile handset of claim 10, wherein the at least one integral navigation and alphanumeric key further includes indicia thereon irradiated by the at least one illumination source comprising a proximate backlighting panel.

17. The mobile handset of claim 10, additionally comprising a dual function key and associated switch for sending stored dialing information and entering user input when in alphanumeric mode and alternatively selecting menu options when in navigation control mode.

18. The mobile handset of claim 10, additionally comprising a dual function key and associated switch for ending a telephone call when in alphanumeric mode and alternatively moving up in the menu hierarchy when in navigation control mode.

19. The mobile handset of claim 10, wherein at least one illuminatable housing surface area includes a single illuminatable housing surface area that is illuminated with the at least one integral navigation and alphanumeric key when the mobile handset is in the navigation mode.

20. The mobile handset of claim 19, wherein the illuminatable housing surface area has an oval configuration that is illuminated with the at least one integral navigation and alphanumeric key when the mobile handset is in the navigation mode.

21. The mobile handset of claim 10, wherein at least one illuminatable housing surface area includes a multiple illuminatable housing surface areas that are illuminated with the at least one integral navigation and alphanumeric key when the mobile handset is in the navigation mode.

22. The mobile handset of claim 21, wherein the multiple illuminatable housing surface areas are illuminated with the at least one integral navigation and alphanumeric key to form an illuminated cross-shaped configuration when the mobile handset is in the navigation mode.

* * * * *